June 15, 1965  W. H. HOGAN  3,188,820
FLUID EXPANSION REFRIGERATION APPARATUS
Filed Nov. 12, 1963  3 Sheets-Sheet 1
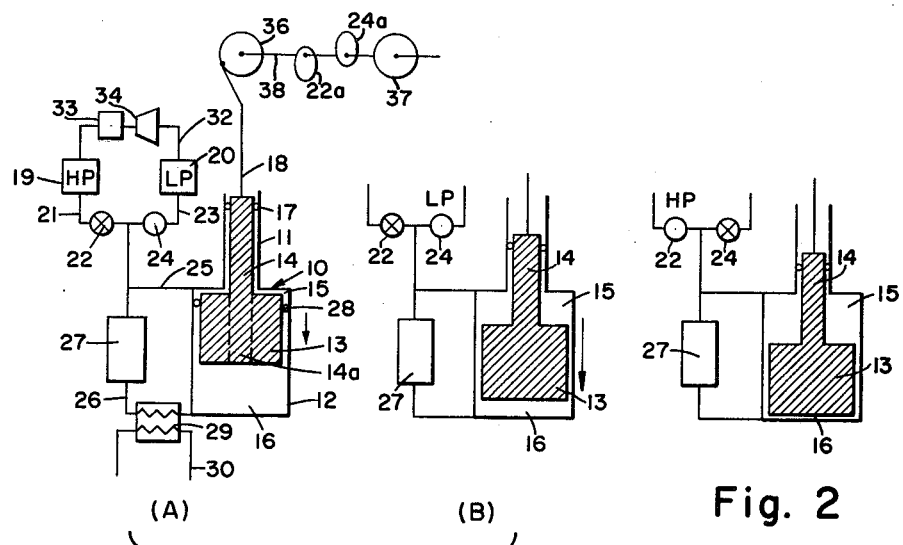
Fig. 1
Fig. 2
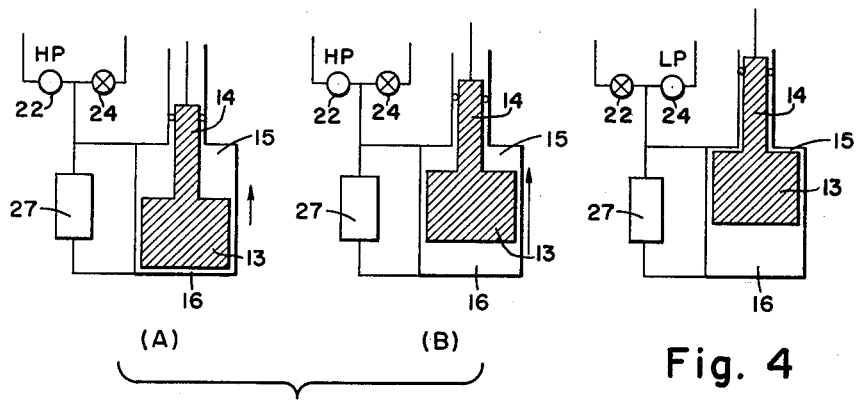
Fig. 3
Fig. 4
INVENTOR.
Walter H. Hogan
BY
Attorney June 15, 1965    W. H. HOGAN    3,188,820
FLUID EXPANSION REFRIGERATION APPARATUS
Filed Nov. 12, 1963    3 Sheets-Sheet 3

INVENTOR.
Walter H. Hogan
BY
Attorney

United States Patent Office 3,188,820
Patented June 15, 1965

3,188,820
FLUID EXPANSION REFRIGERATION APPARATUS
Walter H. Hogan, Wayland, Mass., assignor to Arthur D. Little, Inc., Cambridge, Mass., a corporation of Massachusetts
Filed Nov. 12, 1963, Ser. No. 322,790
4 Claims. (Cl. 62—6)

This invention relates to apparatus for developing low-temperature refrigeration, and more particularly to an apparatus of this character which, in the development of low-temperature refrigeration, delivers energy that is part mechanical and part thermal.

In United States Patent No. 2,906,101, issued to McMahon and Gifford, there is described a novel refrigeration apparatus and method in which refrigeration is developed through the use of fluid expansion, and energy is delivered external of the system. In United States Patent No. 2,966,035, issued to Gifford, a refrigeration method and apparatus are described which are directed to a so-called "no-work" cycle in which refrigeration is obtained by removing more sensible heat from a system than is taken into the system by the refrigerating fluid used. Thus in the method and apparatus of 2,966,035 the energy delivered external of the system is thermal energy. For purposes of this discussion the apparatus which delivers nonthermal energy external of the system may be considered to be a "work" cycle while that which delivers thermal energy has come to be known as the no-work cycle inasmuch as no mechanical work is delivered.

Each of these systems has its advantages and each has found application particularly in miniaturized equipment. However, when these apparatus are made in a relatively large size to deliver relatively large quantities of refrigeration it has been found that difficulties arise in their operations, particularly in the operation of the no-work cycle. These difficulties can be traced to the development of frictional forces and to the existence of a pressure drop across the regenerator which is a part of the fluid transport system in the refrigerator.

As will be apparent from an examination of the cycle and the apparatus of U.S.P. 2,966,035, it is necessary to supply some mechanical work to the system to drive the displacer through the cycle indicated. An analysis of the cycle indicates that the direction of displacer motion is in fact opposed to that which would be the natural motion of the displacer within the system. Thus difficulties have arisen in providing gears which were durable enough to perform the operation in the no-work cycle over extended periods of time. In contrast to the no-work cycle, the work cycle is capable of delivering mechanical energy external of the system. But when the work cycle is performed in large-sized apparatus the amount of mechanical work which must be stored and dissipated requires excessively rugged mechanisms and an excessively large flywheel when the apparatus is driven at the slow reciprocating speeds which are preferred for this type of apparatus. However, by combining the work and no-work apparatus there results an improved refrigerator which possess the inherent advantages of both of these apparatus, and at the same time affords the possibility of balancing the work required in the no-work cycle to move the displacer against the work which is delivered in mechanical form external of the system in the work cycle. The apparatus of this invention provides such a means for combining the characteristics of the two apparatus such that the advantages of the work and no-work cycles and apparatus can be retained while eliminating mechanical difficulties associated with these apparatus. This is done by retaining the enclosed space of the no-work apparatus with the two chambers of variable volumes and replacing the displacer with a sliding body which is part piston and part displacer. Ideally, the piston delivers work which is substantially equal to that which is required in a no-work apparatus and which is attributable to frictional losses and to the pressure drop across the regenerator in the system.

In is therefore the primary object of this invention to provide an improved refrigeration apparatus which combines the thermodynamic characteristics of the no-work apparatus and the mechanical characteristics of the work apparatus. It is another object of this invention to provide apparatus of the character described which can be adapted to large-scale refrigeration systems, and which at the same time is not subject to the requirement for excessive work input or work absorption means. It is yet another object of this invention to provide a refrigeration apparatus which is essentially self-sustaining, that is, which makes use of the mechanical work delivered to provide the necessary work required to drive a displacer, which in its motion is capable of delivering thermal energy external of the system. Other objects of the invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claims.

For a fuller understanding of the objects of the invention, reference should be had to the following detailed description taken in connection with the accompanying drawings in which FIGS. 1-4 are simplified diagrammatic views of the apparatus of this invention illustrating the steps in the cycle;

Figure 5:
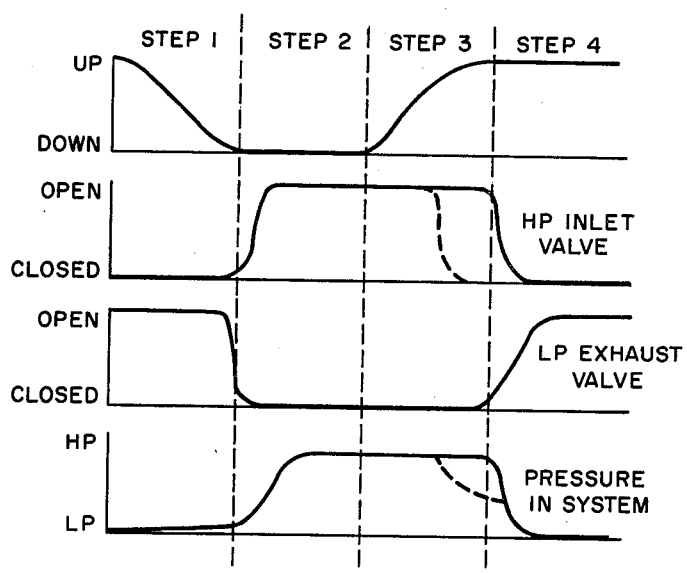
FIG. 5 illustrates a typical operational sequence of the cycle of this invention showing the operation of the displacers and the valves, as well as the pressure variations in the refrigerator.

In FIGS. 1-4 for convenience in describing the cycle of this invention, the apparatus is shown in simplified form and the figure numbers refer to the steps of the cycle which will be described in detail below. In order to simplify the drawings and cycle presentation the valves which are closed are indicated by an "x" in a circle, while those which are open are shown as an open circle and are labelled for ease of identification. Thus for example in FIG. 2 it will be seen that the high-pressure valve from the high-pressure reservoir into the fluid system is open.

Turning now to FIG. 1, it will be convenient to identify the component parts of a typical refrigeration apparatus constructed in accordance with this invention. A fluid-tight enclosed space of a stepped configuration generally designated as 10 is made up of an upper section 11 and a lower section 12 which is of a larger diameter than the upper section 11. It will be appreciated that the terms "upper" and "lower" are used in a relative sense, and that the refrigeration apparatus may be oriented in any manner. These terms are employed in this description only to correspond to the orientation illustrated in the figures.

Within the fluid-tight enclosed space 10 is a sliding body which is formed of a displacer section 13 and a piston section 14. This piston section 14 may be thought to extend through the sliding body, as indicated by dotted lines and designated 14a. In the following detailed description of this invention, reference will be made from time to time to displacer and piston portions of the sliding body and in keeping with the common practice the term "piston" will be used to include a sliding body moving within a cylindrical vessel which experiences pressure differentials on its surfaces, i.e., the two ends of piston 14, and which responds to changes in the thermodynamic characteristics of the fluid acting upon its surfaces to generate mechanical work. The term "displacer" will be reserved for a similar body which experiences essentially no pressure differentials on its surfaces and which generates or delivers no external work. Thus 13 which in FIG. 1 literally surrounds the piston 14 is the displacer portion of the sliding body, and the sliding body may be called a displacer-piston. In the following description of the apparatus and the cycle, it may be considered that the piston portion 14 is responsible for mechanical energy while the displacer 13 is responsible for the delivery of thermal energy outside the system. Thus it will be readily apparent that there arises a unique combination of the work and no-work apparatus as shown in U.S.P. 2,906,101 and U.S.P. 2,966,035.

Returning now to FIG. 1, it will be seen that when the sliding body formed of the displacer and piston portions travels vertically within the stepped housing, it defines within the enclosed space 10 two chambers of variable volumes. These are an upper chamber 15 and a lower chamber 16, the former being the warm chamber, the latter being the cool chamber. Because of pressure differentials which exist within the enclosed space 10 and between said enclosed space and the exterior of piston 14, it is necessary to provide suitable fluid-tight seals 17 and 28, the former associated with the piston portion 14, the latter with the displacer portion 13 of the sliding body. A driving rod 18 may be affixed to the sliding body and attached to suitable control means which include means for storing and supplying mechanical energy as described below.

Associated with the enclosed space and forming a part of the fluid system are a high-pressure fluid supply reservoir 19 and a low-pressure fluid exhaust reservoir 20. A high-pressure fluid conduit 21, controlled by valve 22, and a low-pressure fluid conduit 23, controlled by valve 24, communicate with a branch conduit 25 which leads into the upper warm chamber 15 of the refrigeration apparatus. Conduit 25 and conduit 26 make up a fluid path which communicates between upper chamber 15 and lower chamber 16. This fluid path has associated with it a thermal storage means 27, typically a regenerator, and means for delivering refrigeration to an external load. This latter means may be a heat station or it may be a heat exchanger 29 such as shown in FIG. 1. In order to deliver refrigeration a conduit 30 is associated with the heat exchanger 29 and is adapted to conduct a heat transfer liquid through the heat exchanger 29 for delivery of refrigeration to the external load.

In a closed system such as illustrated in FIG. 1, there is provided a fluid conduit 32 which communicates between the low-pressure reservoir 20 and high-pressure reservoir 19. This fluid conduit 32 also contains a cooling means 33 and cleanup system 34 and compressor 34. Of course, it need not be a closed system, and the low-pressure exhaust may vent to the air, while the high-pressure fluid may be supplied from a suitable source such as compressed gas cylinders. Inasmuch as the apparatus must alternate between storing and supplying mechanical energy, some suitable control means must be provided. Typically, these control means may be a driving wheel 36, flywheel 37 mounted on a common shaft 38, and suitable valve actuating means adapted to open and close valves 22 and 24 and to coordinate the movement of the displacer-piston with the operation of these valves. Such actuating means are illustrated as cams 22a and 24a which are mechanically connected, by means not shown, to valves 22 and 24, respectively.

The temperature history diagram of the no-work portion of the cycle which is performed in this apparatus is essentially that illustrated in U.S.P. 2,966,035. The operational sequence diagram for the apparatus of this invention is shown in FIG. 5. Using FIG. 5 along with FIGS. 1–4 it is possible to briefly describe the refrigeration cycle which takes place in this apparatus. It will be seen to be a combination of the no-work cycle described in U.S.P. 2,966,035, and the basic cycle of U.S.P. 2,906,101.

FIG. 1 illustrates the position of the displacer-piston and the condition of the valves at what may be termed to be the beginning of a cycle. It will be seen that the displacer-piston is in its uppermost position at the beginning of this cycle as shown in FIG. 1A. The high-pressure valve 22 associated with the fluid supply reservoir is closed, and the low-pressure valve 24 permitting fluid to flow through the regenerator and enter into the low-pressure reservoir 20 is open. This expansion and discharge of high-pressure initially cooled fluid from the chamber 16 which is begun in step 4 is continued in step 1 as the displacer-piston moves downwardly as shown in FIG. 1B; and will be seen to be completed with the displacer-piston at its lowermost position. Expansion, of course, effects further cooling and provides refrigeration. During the downward travel of the displacer-piston (FIG. 1B) and the expansion and exhausting of the fluid from the cold chamber, the fluid gives up heat to the regenerator, thus storing refrigeration for a subsequent step in the cycle. By the time the fluid leaves the regenerator, it has reached a temperature which is actually above that at which the high-pressure fluid was originally supplied. The way in which this is accomplished will become apparent in the following description. The difference in temperature which is in effect the delivery of thermal energy makes up at least a portion of the refrigeration attained.

Once the displacer-piston has reached its lowest position, as shown in FIG. 2, step 2 is begun. In this step, the high-pressure valve 22 in the fluid system is opened thus permitting high-pressure fluid to flow into volume 15 and compress residual fluid left there. Thus the residual fluid is heated by this compression. In this step, the displacer-piston dwells temporarily in this position by virtue of the fact that the shaft is so driven as to force it to remain in its lowermost position.

Step 3 comprises the moving of the displacer-piston in an upwardly direction. During step 3, the high-pressure valve 22 associated with the refrigerator of the apparatus remains open as shown in FIG. 3A, thus permitting additional high-pressure fluid to mix with the heated high-pressure fluid coming from volume 15. This in effect provides a high-pressure fluid of intermediate temperature which enters the regenerator wherein it is cooled by virtue of refrigeration stored there during step 1, and it enters the cold chambers 16 as high-pressure initially cooled fluid. Throughout this third step the displacer-piston moves upwardly (FIG. 3B) to fill chamber 16 with initially cooled high-pressure fluid.

As shown in FIG. 5 in the dotted line in the high-pressure inlet valve sequence diagram, it is possible to close this high-pressure valve in step 3 somewhat before the end of the step, i.e., some time after chamber 16 has reached at least one-half of its maximum volume. Although leaving the high-pressure valve open for the full stroke provides the greatest gross refrigeration, the regenerator losses are greatest. Closing the high-pressure valve 22 before the end of step 3 provides less refrigeration, but also less regenerator loss which frequently results in more net refrigeration available for less fluid circulation. Therefore there is offered an alternative in the operation of this high-pressure valve in step 3. The effect which this early cutoff of the high-pressure valve controlling the refrigeration fluid has upon the pressure within the refrigerator is illustrated also in FIG. 5 by the dotted line in the section entitled "Pressure in System." It should be noted that after early cutoff, the fluid in cold chamber 16 is expanded and further cooled during completion of step 3. Thus this step comprises initial and final cooling of the fluid.

At the end of step 3, the displacer-piston is in its uppermost position, and in moving into this uppermost position has delivered energy in a mechanical form external of the system by driving the displacer-piston upwardly and turning wheel 36 and flywheel 37 wherein energy is stored for driving the displacer-piston downwardly in step 1 as described previously. The volume of the warm chamber 15 has been decreased to a minimum while the volume of the cold chamber 16 has reached a maximum volume.

Step 4 comprises the opening of the low-pressure valve 24 to exhaust fluid to the low-pressure reservoir while the displacer-piston remains at top dead center (FIG. 4), and the subsequent expansion and further cooling of the fluid within chamber 16 and the regenerator, thus delivering refrigeration at a desired point along the fluid path. With the completion of the expansion step 4, the high-pressure valve 22 associated with the fluid system is maintained closed and the cycle is in a position to begin step 1 as described.

It is now possible to describe step 1 more fully. At the beginning of step 1, the low-pressure fluid in chamber 16 is at a lower temperature than that of the high-pressure fluid that filled chamber 16 by virtue of the adiabatic expansion of the residual fluid in chamber 16 from high pressure to low pressure. The downward movement of displacer-piston 13 and 14 expels the fluid in chamber 16 initially through heat exchanger 29. In this heat exchanger the temperature of the fluid can be raised to substantially the temperature of the fluid in chamber 16 before its expansion, thereby providing refrigeration to the fluid in conduit 30 or to any other suitable heat source. The low-pressure fluid then enters the cold end of the regenerator 27 at substantially the same temperature as that of the high-pressure fluid leaving the regenerator 27 during the pressurizing of chamber 16 in step 3. During passage of this fluid through the regenerator 27, heat is extracted from the regenerator matrix to increase the temperature of the fluid so that on leaving the regenerator 27 at the warm end the fluid temperature is substantially the same as that temperature of the entering high-pressure fluid during step 3 which, it will be remembered, was higher than the temperature of the high-pressure fluid being supplied through conduit 21 from the high-pressure fluid source 19. The fluid leaving regenerator 27 fills the expanding chamber 15 with low-pressure fluid and the excess leaves through low-pressure valve 24 to be returned to the low-pressure reservoir 20. Since the fluid leaves the refrigeration system at a higher temperature than the fluid supplied to the system, some thermal energy is extracted from the system.

From a description of the cycle as presented above, it will be seen that it is necessary during the downward displacement of the displacer-piston 13 and 14 to apply some energy external of the system in order to cause the displacer-piston to move downwardly as required in steps 1 and 2. This is done through the energy stored in flywheel 37. In like manner, during steps 3 and 4 in the travelling of the displacer-piston upwardly by virtue of the fact of the high-pressure fluid in chamber 16, there is mechanical work delivered external of the system through driving rod 18 to driving wheel 36 and flywheel 37. Thus during approximately one-half of the cycle work must be put into the system while during the other half work can be taken out.

In this balancing of work in and work out the apparatus of this invention differs materially from the work cycle or the no-work cycle described above. This difference can be clearly illustrated with reference to FIG. 6. In this figure, the work in and work out in each of the systems is represented diagrammatically, the work out being shown above the horizontal line, the work in being shown below the line. In the case of the work cycle where mechanical work is delivered external of the system, it will be seen that the actual work delivered is that which is indicated in the cross-hatched portion above the line. The work out is not the ideal quantity which would be represented by the area under the horizontal line inasmuch as some of it is lost to friction and a portion is also lost to the pressure drop which occurs in the regenerator 27 in FIG. 1. In like manner, the work which must be put into the work cycle is that which is shown in the cross-hatched portion below the line. This too is, of course, somewhat more than is ideally required which would be represented by the area over the horizontal line, due again to friction in the system and pressure drop in the regenerator.

Figure 6:
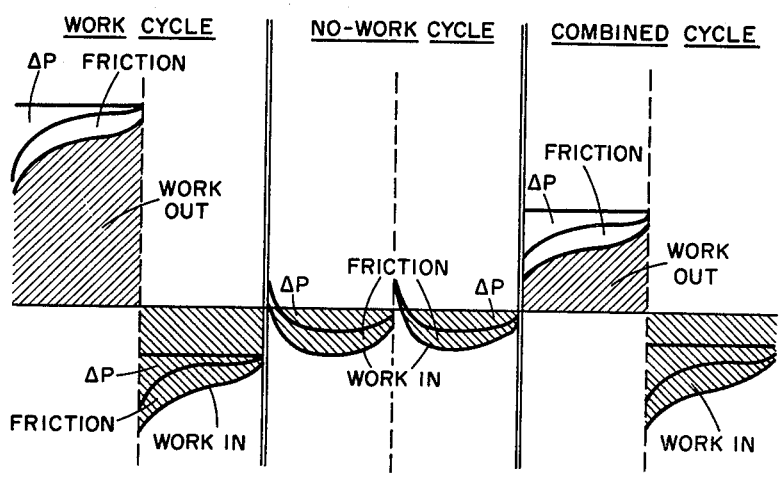
FIG. 6 is a diagrammatic representation of the balancing of the work input with the work output and a comparison of this with the work and the no-work cycles.

The central section of FIG. 6 illustrates the fact that it is always necessary to put work into the no-work cycle in order to make up for the friction generated as well as for the pressure drop which exists across the regenerator. The pressure at the top of the regenerator is greater than that at the bottom (as oriented in FIG. 1) and thus there is a $\Delta P$ across the length of the regenerator. This in turn means that ideal conditions are not realized in the no-work cycle, and that there is always somewhat greater pressure in the upper chamber than in the lower, thus causing the displacer of the no-work cycle to tend to move in a direction opposite to that which is required in the cycle itself. Thus it is required to provide driving means in the no-work apparatus to furnish the work indicated in FIG. 6.

In contrast to the work cycle and the no-work cycle, it will be seen in FIG. 6 that in the combined cycle of this invention it is possible to substantially balance the work out which is developed in the form of mechanical energy, delivered by virtue of the presence of the piston, with the work which is necessary to put into the cycle by virtue of the necessity for moving the displacer. This balance means then that there results a refrigeration apparatus which is substantially balanced as far as work input and output is concerned.

The net result is that the work delivered by the piston portion of the sliding body is substantially equivalent to the work required to operate the control means which include the means for storing and supplying energy and the valve actuating means.

This balancing of work in and work out is of particular interest in large equipment where it is necessary to provide gears and driving means which can handle the energy of the system. As pointed out previously, in miniature equipment this is not a great problem but becomes one in large equipment which must operate over a long period of time.

Figure 7:
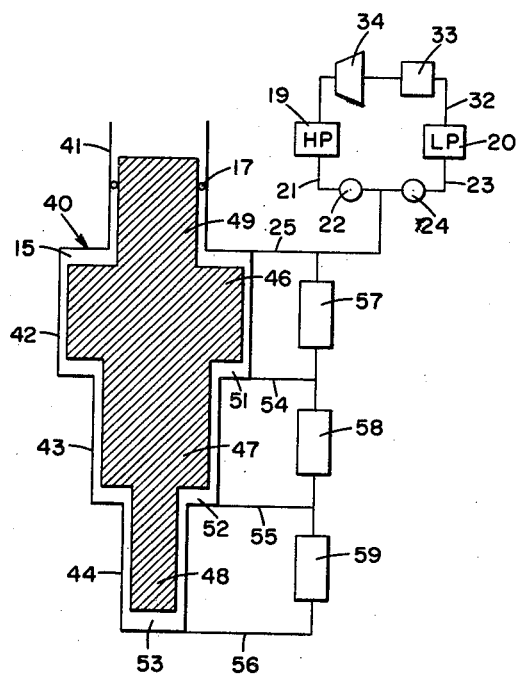
FIG. 7 is a modification of the apparatus of FIG. 1 showing the application of the apparatus to a multi-chambered device.

FIG. 7 illustrates a modification of the apparatus of FIG. 1 and shows how the apparatus may be applied to multi-chambered equipment. It may, under some operational conditions, be desirable to use a multiplicity of cold chambers each at a successively lower temperature. In effect the sum of these chambers is the equivalent to cold chamber 16. In the apparatus of FIG. 7 the stepped enclosure 40 has a section 41 housing the piston portion and stepped sections 42, 43 and 44 housing the displacer portion. The displacer portion of the sliding body is in a stepped configuration being made up of sections 46, 47 and 48, while the piston portion is that designated 49. The overall fluid path which joins the upper warm chamber 15 with the successively colder chambers 51, 52 and 53, is made up of conduit 25 along with branch conduits 54, 55 and 56. Within this fluid passageway are three regenerators, each being associated with one of the cold chambers. These regenerators are designated 57, 58 and 59. The cycle is the same as that described with reference to FIGS. 1-4 and the overall balancing of the work in and work out can be effected in the same manner as described above in connection with FIG. 6.

With the combination of the work and no-work aspects of the fluid expansion refrigeration apparatus of U.S.P. 2,906,101 and U.S.P. 2,966,035, there is provided in the apparatus of this invention a refrigeration device capable of delivering large quantities of refrigeration and of being self-contained in the work input is balanced with the work output thus avoiding the difficulties associated with either the work or the no-work cycles individually. Many modifications of this apparatus are of course possible, and they are contemplated as being included in the claims.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:
1. A fluid expansion refrigeration apparatus, comprising in combination
 (a) a fluid-tight enclosure;
 (b) a sliding body, including a displacer portion and a piston portion, movable within said enclosure thereby to define therein first and second chambers of different and variable volumes;
 (c) a fluid path communicating between said chambers;
 (d) thermal storage means associated with said fluid path;
 (e) a high-pressure fluid supply reservoir in communication with said fluid path;
 (f) a low-pressure fluid exhaust reservoir in communication with said fluid path;
 (g) valve means associated with said high-pressure and low-pressure reservoirs and adapted to admit high-pressure fluid to and release fluid to low-pressure from said chambers; and
 (h) control means, including energy storing and energy supplying means and valve actuating means, adapted to coordinate the movement of said sliding body and the operation of said valve means, whereby high-pressure fluid is supplied to said first chamber during those steps of the refrigeration operation when said sliding body is moving to bring said first chamber from its maximum volume to its minimum volume and fluid is exhausted from said second chamber during those steps of the refrigeration operation when said sliding body is moving to bring said second chamber from its maximum volume to its minimum volume;
said piston portion of said sliding body delivering work external of said enclosure thereby furnishing at least part of the energy required to drive said control means.

2. Refrigeration apparatus in accordance with claim 1 further characterized by having means adapted to deliver refrigeration to an external load.

3. Refrigeration apparatus in accordance with claim 1 wherein said work delivered by said piston portion is substantially equivalent to that required by said control means.

4. A fluid expansion refrigeration apparatus, comprising in combination
 (a) a fluid-tight enclosure;
 (b) a sliding body, including a piston portion and a displacer portion of stepped configuration, movable within said enclosure thereby to define therein a first chamber and a series of second chambers, each of said chambers being of variable volume;
 (c) a fluid path communicating between said first chamber and said series of second chambers;
 (d) thermal storage means associated with said fluid path;
 (e) a high-pressure fluid supply reservoir in communication with said fluid path;
 (f) a low-pressure fluid exhaust reservoir in communication with said fluid path;
 (g) valve means associated with said high-pressure and low-pressure reservoirs and adapted to admit high-pressure fluid to and release fluid to low-pressure from said chambers; and
 (h) control means, including energy storing and energy supplying means and valve actuating means, adapted to coordinate the movement of said sliding body and the operation of said valve means, whereby high-pressure fluid is supplied to said first chamber during those steps of the refrigeration operation when said sliding body is moving to bring said first chamber from its maximum volume to its minimum volume and fluid is exhausted from said second chambers during those steps of the refrigeration operation when said sliding body is moving to bring said second chambers from their maximum volume to their minimum volumes;
said piston portion of said sliding body delivering work external of said enclosure thereby furnishing at least part of the energy required to drive said control means.

References Cited by the Examiner
UNITED STATES PATENTS
2,966,035 12/60 Gifford _____ 62—6
3,119,237 1/64 Gifford _____ 62—6

ROBERT A. O'LEARY, Primary Examiner.
WILLIAM J. WYE, Examiner.